(12) United States Patent
Fu et al.

(10) Patent No.: US 11,978,000 B2
(45) Date of Patent: May 7, 2024

(54) SYSTEM AND METHOD FOR DETERMINING A DECISION-MAKING STRATEGY

(71) Applicant: ADVANCED NEW TECHNOLOGIES CO., LTD., George Town (KY)

(72) Inventors: Dapeng Fu, Hangzhou (CN); Wenbiao Zhao, Hangzhou (CN); Hong Jin, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 951 days.

(21) Appl. No.: 16/945,277

(22) Filed: Jul. 31, 2020

(65) Prior Publication Data

US 2020/0364719 A1 Nov. 19, 2020

Related U.S. Application Data

(63) Continuation of application No. PCT/CN2019/071700, filed on Jan. 15, 2019.

(30) Foreign Application Priority Data

Feb. 1, 2018 (CN) .......................... 201810102192.5

(51) Int. Cl.
*G06Q 40/02* (2023.01)
*G06F 18/21* (2023.01)
(Continued)

(52) U.S. Cl.
CPC ..... *G06Q 10/0635* (2013.01); *G06F 18/2155* (2023.01); *G06F 18/2185* (2023.01); *G06N 20/00* (2019.01)

(58) Field of Classification Search
CPC ......... G06Q 40/00; G06Q 40/02; G06Q 10/06
(Continued)

(56) References Cited

U.S. PATENT DOCUMENTS 6,397,334 B1   5/2002   Chainer
7,093,129 B1   8/2006   Gavagni
(Continued)

FOREIGN PATENT DOCUMENTS

WO   2017059576   4/2017
WO   2018055340   3/2018

OTHER PUBLICATIONS

Hyungtae Lee et al.: "Fast Object Localization Using a CNN Feature Map Based Multi-Scale Search", arxiv.org, Cornell University Library, 201 Olin Library Cornell University Ithaca, NY 14853, Apr. 12, 2016, XP080695042, Section 3.2, Figure 3.

(Continued)

*Primary Examiner* — Nga B Nguyen
(74) *Attorney, Agent, or Firm* — Seed IP Law Group LLP (57) ABSTRACT

One embodiment of the present disclosure provides a system and method for determining a decision-making strategy. During operation, the system can obtain sample data corresponding to a service. The system can pre-determine, based on the sample data and the service, a basic parametric shape model and can generate a plurality of shape parameters for the basic parametric shape mode. The system can then generate one or more parametric shape models with different shapes based on the plurality of shape parameters. The system can determine goodness-of-fit of the one or more parametric shape models with respect to a pre-defined decision-making strategy. Next, the system can in response to determining that the goodness-of-fit of at least one parametric shape model satisfies a set of objectives, output- (Continued)

ting the at least one parametric shape model as an optimum decision-making strategy for the service.

18 Claims, 7 Drawing Sheets

(51) Int. Cl.
*G06F 18/214* (2023.01)
*G06Q 10/06* (2023.01)
*G06Q 10/0635* (2023.01)
*G06N 20/00* (2019.01)

(58) Field of Classification Search
USPC .................................................... 705/7.28
See application file for complete search history.

(56) References Cited

U.S. PATENT DOCUMENTS

| | | | |
|---|---|---|---|
| 7,401,012 B1 | 7/2008 | Bonebakker | |
| 7,872,584 B2 | 1/2011 | Chen | |
| 8,180,629 B2 | 5/2012 | Rehberg | |
| 8,448,226 B2 | 5/2013 | Narasimhan | |
| 8,966,613 B2 | 2/2015 | Horvitz | |
| 9,036,943 B1 | 5/2015 | Baldwin | |
| 9,582,843 B2 | 2/2017 | Leonard | |
| 9,607,138 B1 | 3/2017 | Baldwin | |
| 10,475,014 B1 | 11/2019 | Ramalingam | |
| 10,554,738 B1 | 2/2020 | Ren | |
| 2001/0046659 A1 | 11/2001 | Oster | |
| 2002/0136459 A1 | 9/2002 | Imagawa | |
| 2003/0088532 A1* | 5/2003 | Hampshire, II | G06N 3/08 706/16 |
| 2003/0229789 A1 | 12/2003 | Morais | |
| 2004/0167765 A1 | 8/2004 | Abu El Ata | |
| 2004/0196363 A1 | 10/2004 | Diamond | |
| 2005/0232424 A1 | 10/2005 | Dobranski | |
| 2009/0087025 A1 | 4/2009 | Ma | |
| 2009/0206993 A1 | 8/2009 | Di Mambro | |
| 2010/0128923 A1 | 5/2010 | Kiya | |
| 2010/0135490 A1 | 6/2010 | Kwon | |
| 2010/0205108 A1* | 8/2010 | Mun | G06Q 40/03 705/36 R |
| 2011/0069892 A1 | 3/2011 | Tsai | |
| 2011/0162679 A1 | 7/2011 | Demmeler | |
| 2012/0269346 A1 | 10/2012 | Best | |
| 2013/0015946 A1 | 1/2013 | Lau | |
| 2013/0182002 A1 | 7/2013 | Macciola | |
| 2013/0208103 A1 | 8/2013 | Sands | |
| 2014/0037184 A1 | 2/2014 | Gorski | |
| 2014/0270411 A1 | 9/2014 | Shu | |
| 2014/0309805 A1 | 10/2014 | Ricci | |
| 2014/0313334 A1 | 10/2014 | Slotky | |
| 2015/0036891 A1 | 2/2015 | Takenouchi | |
| 2015/0088783 A1* | 3/2015 | Mun | G06Q 40/02 705/36 R |
| 2015/0103170 A1 | 4/2015 | Nelson | |
| 2015/0110364 A1 | 4/2015 | Niinuma | |
| 2015/0110366 A1 | 4/2015 | Sezille | |
| 2015/0341370 A1 | 11/2015 | Khan | |
| 2016/0034786 A1 | 2/2016 | Suri | |
| 2016/0044030 A1 | 2/2016 | Galwas | |
| 2016/0063235 A1 | 3/2016 | Tussy | |
| 2016/0283787 A1 | 9/2016 | Nepomniachtchi | |
| 2016/0307029 A1 | 10/2016 | Vaknin | |
| 2017/0048244 A1 | 2/2017 | Loughlin-Mchugh | |
| 2017/0060867 A1 | 3/2017 | Moutinho | |
| 2017/0061563 A1 | 3/2017 | Falkenstern | |
| 2017/0148102 A1 | 5/2017 | Franke | |
| 2017/0293894 A1 | 10/2017 | Taliwal | |
| 2017/0300911 A1* | 10/2017 | Alnajem | G06Q 20/4014 |
| 2017/0364825 A1 | 12/2017 | Tiell | |
| 2018/0047208 A1 | 2/2018 | Marin | |
| 2018/0083973 A1 | 3/2018 | Paraskevas | |
| 2018/0182039 A1 | 6/2018 | Wang | |
| 2018/0247112 A1 | 8/2018 | Norimatsu | |
| 2018/0260793 A1 | 9/2018 | Li | |
| 2018/0300576 A1 | 10/2018 | Dalyac | |
| 2019/0035112 A1 | 1/2019 | Lee | |
| 2019/0073641 A1 | 3/2019 | Utke | |
| 2019/0156178 A1 | 5/2019 | Thornton | |
| 2019/0266015 A1 | 8/2019 | Chandra | |
| 2019/0294878 A1 | 9/2019 | Endras | |
| 2019/0355366 A1 | 11/2019 | Ng | |
| 2020/0005151 A1 | 1/2020 | Jiang | |
| 2020/0034958 A1 | 1/2020 | Campbell | |
| 2020/0050939 A1 | 2/2020 | Zhu | |
| 2020/0051237 A1 | 2/2020 | Spivey | |
| 2020/0175352 A1 | 6/2020 | Cha | |
| 2020/0349370 A1 | 11/2020 | Lambert | |

OTHER PUBLICATIONS

Zhou Huabing et al.: "Image Classification Based on Region of Interest Detection", Visual Communications and Image Processing; Jan. 20, 2004; San Jose; vol. 9813, Dec. 14, 2015, pp. 98130U-98130U, XP060063208, paragraph [0001]; figure 1.

W. Samek, T. Wiegand, and K.-R. Muller. (2017). Explainable artificial Intelligence: understanding, visualizing and interpreting deep learning models.: [Online]. Available: https://arxiv.org/abs/1708.08296 (Year: 2017).

Jeffery De Dejin, ("Automatic car damage recognition using convolutional neural networks", Internship report MSc Business Analytics Mar. 29, 2018, pp. 1-53, Vrije Universiteit Amsterdam Faculty of Science, Amsterdam)(Year:2018).

* cited by examiner

US 11,978,000 B2

SYSTEM AND METHOD FOR DETERMINING A DECISION-MAKING STRATEGY

RELATED APPLICATION

Under 35 U.S.C. § 120 and § 365(c), this application is a continuation of PCT Application No. PCT/CN2019/071700, entitled "METHOD, APPARATUS AND ELECTRONIC DEVICE FOR DETERMINING DECISION-MAKING STRATEGY CORRESPONDING TO SERVICES," by inventors Dapeng Fu, Wenbiao Zhao, and Hong Jin, filed 15 Jan. 2019, which claims priority to Chinese Patent Application No. 201810102192.5, filed on 1 Feb. 2018.

BACKGROUND

Field

The present application relates to a method and system for facilitating risk control for an online financial service. More specifically, this disclosure is related to a system and method for determining a decision-making strategy corresponding to a service.

Related Art

The rapid development of computing technologies has allowed the Internet technology to be extended into the financial domain. Various types of online financial services (e.g., third-party payment services, peer-to-peer lending services, crowdfunding services, online-banking services, online-brokerage services, etc.) are currently being provided to customers. Risk-control is important to ensure confidence of customers of online financial services and to prevent financial crimes, e.g., fraud risk, manipulating sensitive details, money laundering, etc.

Many online financial services can include or be coupled to a risk-control system. Before the execution of a transaction (e.g., a transfer, a deposit, a withdrawal, etc.), the online financial service can forward the transaction to the risk-control system, which can identify potential risks associated with the transaction and outputs a risk-control command. For example, if the risk-control system identifies a risk (e.g., a fraud risk or a money-laundering risk) associated with an online-banking transaction, it can output a risk-control command to the online-banking service, prompting the online-banking service to stop the transaction and freeze the accounts involved in the transaction. If the risk-control system determines that there is no risk or the risk level is low, it can output a risk-control command to instruct the online-banking service to execute the transaction as normal.

Current implementations of risk-control systems can determine a decision-making strategy that satisfies a number of objectives established by the online service and can recommend the decision-making strategy to the online service, e.g., an online financial service. The recommended decision-making strategy can be associated with a single threshold value that can satisfy multiple objectives of the online service. For example, the threshold value can be represented as a point in a target co-ordinate system to satisfy multiple objectives of the service in a multi-dimensional plane. This point is identified as the decision-making strategy. However, such a risk control system that can provide a decision-making strategy with a single threshold value is likely to be identified and tampered by an untrusted entity. Such tampering of the threshold value can expose the online service to risks and can result in loss of assets, thereby significantly affecting the fraud protection capability of the risk-control system.

SUMMARY

One embodiment of the present disclosure provides a system and method for determining a decision-making strategy corresponding to a service. During operation, the system can obtain sample data corresponding to a service. The system can pre-determine, based on the sample data and the service, a basic parametric shape model and generate a plurality of shape parameters for the basic parametric shape mode. The system can then generate one or more parametric shape models with different shapes based on the plurality of shape parameters. The system can determine goodness-of-fit of the one or more parametric shape models with respect to a pre-defined decision-making strategy. Next, the system can in response to determining that the goodness-of-fit of at least one parametric shape model satisfies a set of objectives, outputting the at least one parametric shape model as an optimum decision-making strategy for the service.

In a variation on this embodiment, the system can in response to determining that the goodness-of-fit of the one or more parametric shape models does not satisfy the set of objectives: hybridize the plurality of shape parameters to generate hybridized set of shape parameters; and update the one or more parametric shape models based on the hybridized set of shape parameters In a variation on this embodiment, the system can in response to determining that the goodness-of-fit of the one or more parametric shape models does not satisfy the set of objectives: mutate the plurality of shape parameters to generate mutated set of shape parameters; and update the one or more parametric shape models based on the mutated set of shape parameters.

In a further variation on this embodiment, the goodness-of-fit can correspond to a measure of similarity between the pre-defined decision-making strategy and a respective decision-making strategy corresponding to the one or more updated parametric shape models.

In a further variation on this embodiment, the system can determine the goodness-of-fit of the one or more parametric shape models with respect to the predefined decision-making strategy by determining, based on each parametric shape model and the sample data, a disturb rate and a coverage rate. The disturb rate can be associated with a first portion of sample data generated by a reliable service, and wherein the coverage rate is associated with a second portion of the sample data generated by an unreliable entity. The system can then determine a difference between the disturb rate and a pre-defined disturb rate associated with the pre-defined decision-making strategy. Next, the system can determine a difference between the coverage rate and a pre-defined coverage rate associated with the pre-defined decision-making strategy.

In a further variation on this embodiment, the set of objectives include one or more of: a pre-defined goodness-of-fit; a pre-defined disturb rate; and a pre-defined coverage rate.

In a further variation on this embodiment, the system can in response to determining that the goodness-of-fit of the one or more parametric shape models does not satisfy the set of objectives and the one or more parametric shape models corresponds to a last update of the plurality of shape parameters, outputting a parametric shape model with the best goodness-of-fit as an optimum decision-making strategy for the service.

In a further variation on this embodiment, the system can apply the optimum decision-making strategy to real-time transaction data to provide enhanced risk-control for the service.

In a further variation on this embodiment, each parametric shape model describes a relationship between a service parameter of the service and a risk assessment value of the service

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

Embodiments described in the present disclosure provide a technical solution to a technical problem of determining a decision-making strategy with enhanced protection against fraud and tampering by untrusted entities. Specifically, the decision-making strategy can be designed to be more robust and tamper-proof. In other words, the system can provide a curve-based decision-making strategy instead of a single threshold value or a point-based decision-making strategy. The system can flexibly adapt the shape of the curve to meet a set of objectives preset in the risk control system for a specific online service.

In one embodiment, the system may determine a plurality of functions for describing a relationship between a service parameter and a risk assessment value of a service. The plurality of functions can be determined based on multiple set of shape parameters. The system can determine a goodness-of-fit of the plurality of functions with respect to a preset decision-making strategy. The system can recommend a function with the best goodness-of-fit as the optimum decision-making strategy for a service. Furthermore, the system can apply the optimum decision-making strategy to real-time transaction data to provide an enhanced and reliable risk control service. The function can be a curve function or a parametric shape model instead of a threshold point, thereby overcoming the aforementioned shortcomings due to a single threshold value based decision-making strategy.

The terms "curve" and "shape" are used interchangeably in this disclosure.

The terms "curve function" and "parametric shape model" are used interchangeably in this disclosure.

The terms "goodness-of-fit" and "fitness" are used interchangeably in this disclosure.

Risk-Control System

Figure 1:
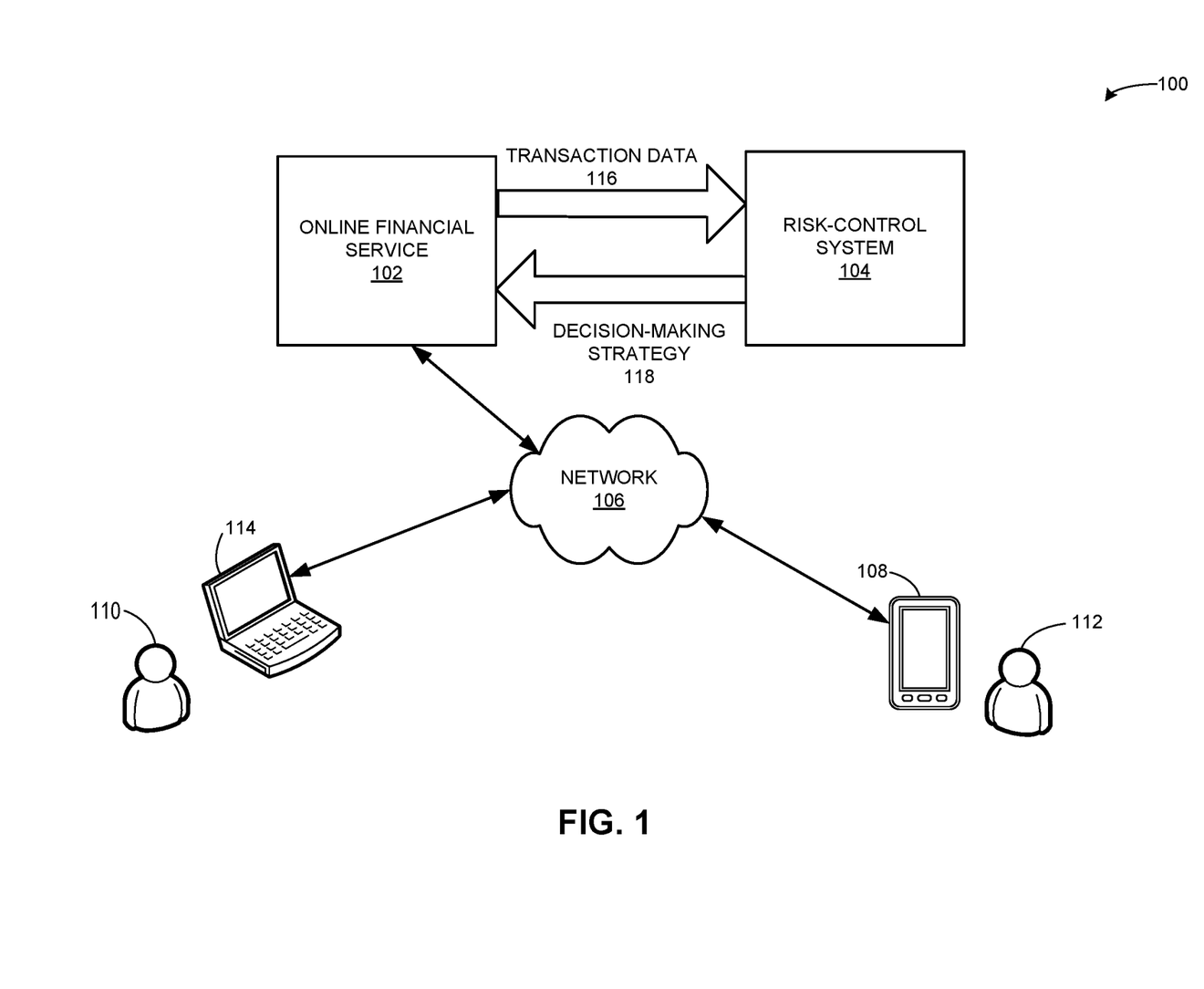
FIG. 1 presents a diagram illustrating an exemplary computing environment, according to one embodiment of the present disclosure.

FIG. 1 presents a diagram illustrating an exemplary computing environment, according to one embodiment of the present disclosure. Computing environment 100 can include an online financial service 102 and a risk-control system 104. Online financial service 102 can provide various internet-based financial services to its customers, such as third-party payment, peer-to-peer lending, etc. Before completing a transaction (or providing a service), online financial service 102 can forward the transaction, including background information associated with the transaction, to risk-control system 104, which can then determine a risk level or identify a potential risk associated with the transaction based on a number of risk-control policies.

Risk-control system 104 can determine a decision-making strategy for the transaction according to the determined risk level or identified risk. Upon receiving decision-making strategy 118, online financial service 102 may perform a risk-control action specified according to decision-making strategy 118. Specifically, online financial service 102 can successfully distinguish between an authentic transaction and an inauthentic transaction, e.g., a fraud transaction, based on decision-making strategy 118.

Online financial service 102 can provide services to a number of users (e.g., users 110 and 112) via a network 106 and a number of computing devices (e.g., computing devices 108 and 114) associated with the users. Moreover, online financial service 102 and risk-control system 104 can be implemented on one or more server computers, which can include standalone computers, virtual servers provided by clusters of standalone computers, or cloud servers. Network 106 can include various types of wired or wireless networks. In some embodiments, network 106 can include the public switched telephone network (PSTN) and the Internet.

Computing devices 108 and 114 can include various mobile devices, including but not limited to: smartphones, tablet computers, laptop computers, personal digital assistants (PDAs), various wearable computing devices (e.g., smart glasses and watches), etc. In addition to mobile devices, the solutions provided herein can also be applied to other types of computing devices, such as desktop computers or computer servers.

As discussed previously, single threshold-based decision-making strategy provided can be prone to attacks by untrusted entities and can interrupt normal services provided by online financial service 102 to its customers. For example, a single threshold value can easily be tried by internet or computer hackers to discover the fraud prevention strategy and can manipulate the threshold value to initiate a fraud transaction which can result in loss of assets of the customers. In other words, a risk control system applying a threshold-value based decision-making strategy can make the service susceptible to financial crimes, thereby providing insufficient fraud protection to the customers of the service. Furthermore, the threshold value based decision-making strategy may not cover situations of low risk score and large transaction amount, and high-risk score and low transaction amount in the risk control service. Therefore, what is needed is a robust decision-making strategy that can provide enhanced protection against fraud or tampering by untrusted entities.

Figure 2:
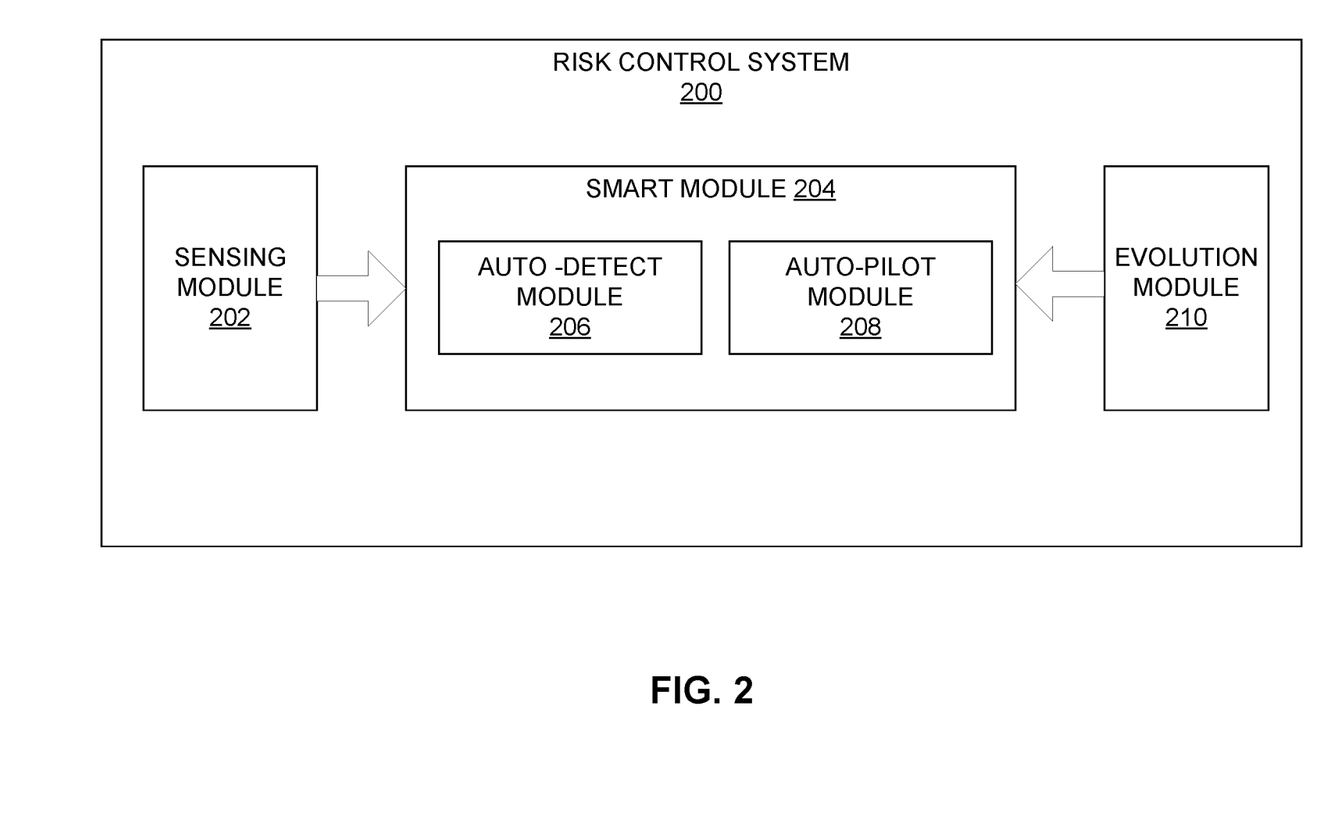
FIG. 2 illustrates an exemplary risk control system, according to one embodiment of the present disclosure.

FIG. 2 illustrates an exemplary risk control system, according to one embodiment of the present disclosure. Risk control system 200 can include three modules, i.e., a sensing module 202, a smart module 204, and an evolution module 210. Sensing module 202 can monitor the presence of any risks and can analyze the risks based on smart analysis and human experience enhancement. In other words, sensing module 202 can apply a model-based smart analysis for analyzing the identified risks and can enhance the analysis by combining with human-based experience. Sensing module 202 can provide the results of risk analysis to smart module 204. Smart module 204 can further include an auto-detect module 206 and an auto-pilot module 208. Auto-detect module 206 can receive the risk analysis from sensing module 202 and can further enhance the risk identification capability of risk control system 200 by intelligently recommending new identification strategies and variables.

Auto-pilot module 208 can intelligently adjust management and control strategies. Auto-pilot module 208 can further implement a method for determining a decision-making strategy for risks recognized by a risk recognition strategy in risk control system 200. The decision-making strategy can satisfy a number of objectives specified by multiple services. Determining the decision-making strategy is essentially a multi-faceted optimization problem, i.e., determining a best solution that can satisfy multiple objectives with respect to the transaction amount and risk score. In current implementations of risk control system 200, a decision-making strategy encompassing just one threshold value for the transaction amount and the risk score is recommended to achieve the multiple objectives. Although the one-threshold decision making strategy is a simple approach, there are a number of problems in recommending a single threshold value for the transaction amount and the risk score in a real-time risk control scenario. Specifically, the threshold-based decision-making strategy may expose the risk control system to fraud and attacks by an untrusted entity, e.g., the untrusted entity may easily tamper the threshold value and make the online financial service susceptible to risks. Some of the embodiments described in the present disclosure overcome the aforementioned shortcomings due to the threshold value based decision-making strategy by applying a curve-based decision-making strategy.

Evolution module 210 can support a model-based self-learning process by providing new variables to smart module 204 and by validating the efficacy of smart module 204. The following paragraphs describe the operations of auto-pilot module 208 in relation to FIGS. 3-6.

Figure 3:
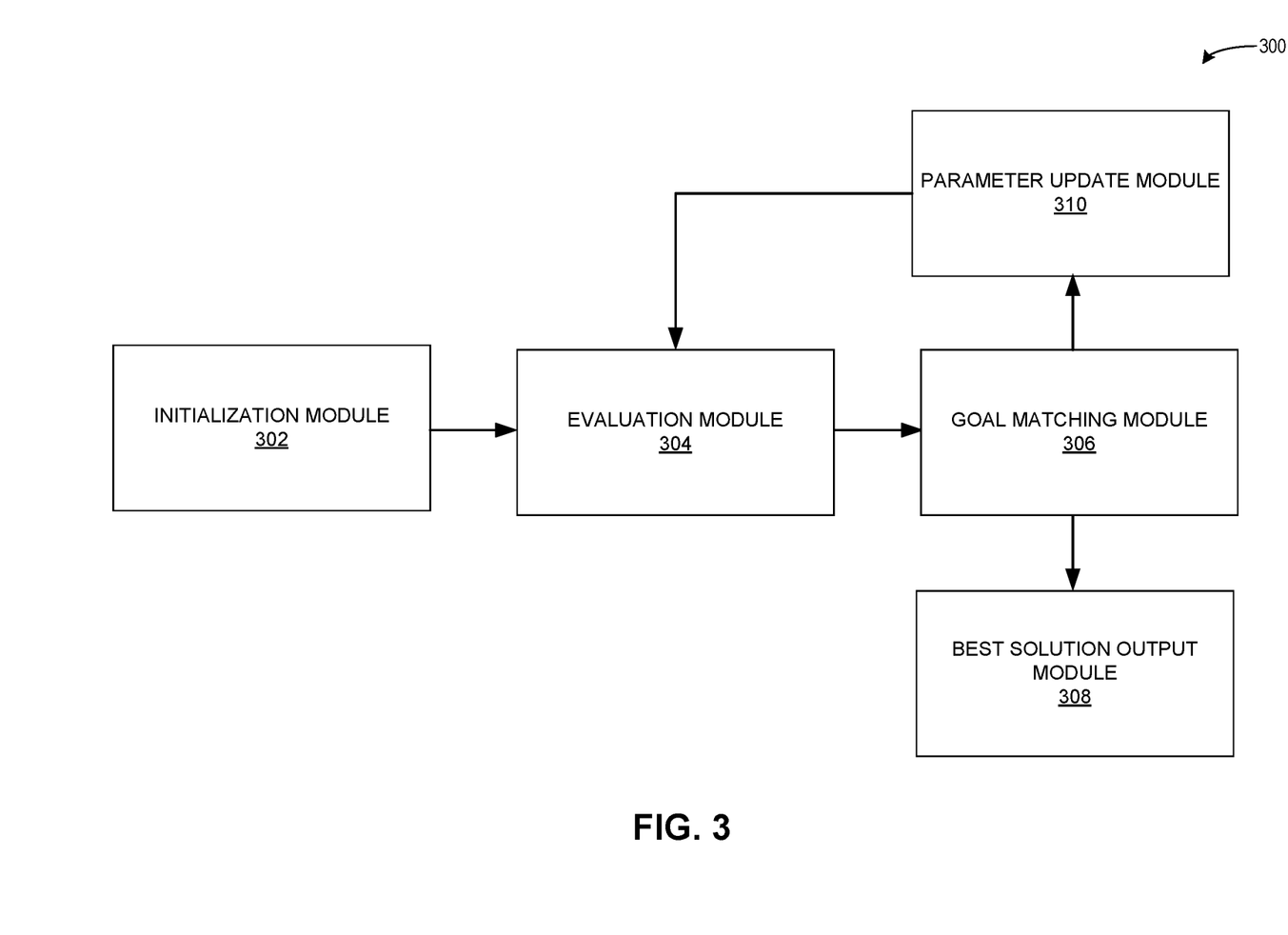
FIG. 3 presents a schematic diagram of a risk control system, according to one embodiment of the present disclosure.

FIG. 3 presents a schematic diagram of a risk control system, according to one embodiment of the present disclosure. In example 300 shown in FIG. 3, operation of auto-pilot module 208 in risk control system 200 (shown in FIG. 2) is described. In the process of determining a decision-making strategy, the risk control system can assume a plurality of basic curve functions based on multiple service experience of risk control experts, however the specific parameters defining the basic curve functions may be unknown.

Optionally, a basic curve function (denoted in equation (1) below) can be built in a device that determines the decision-making strategy corresponding to a service. Alternatively, risk control experts can customize the basic function that can be introduced into the device. Therefore, the experience of the risk control experts can be effectively integrated into the decision-making process of the risk control system. In one embodiment, the basic curve function can be a user-defined function, e.g., a user can select or customize the basic curve function according to a scenario of a service, thereby providing the flexibility to satisfy different types of scenarios in risk control services. For example, one type of scenario can be a low-risk score with high transaction amount, and another type of scenario can be a high-risk score with low transaction amount.

For example, a basic parametric shape model corresponding to a basic curve function can be defined as:

$$y = \frac{a}{1.42e^{(-b*(20-x))}} \quad (1)$$

where x denotes a risk score of the parametric shape model, y denotes a transaction amount, and shape parameters a and b can represent the unknown parameters defining the specific shapes of the curve function. In other words, the risk control system can determine multiple values for each of the shape parameters a and b to result in multiple curve functions. For example, the risk control system can determine four sets of shape parameters as: $\{(a_1, b_1), (a_2, b_2), (a_3, b_3), (a_4, b_4)\}$. Incorporating these four sets of shape parameters into the basic curve function can result in four different curve functions or parametric shape models with different shapes. The terms "curve function" and "parametric shape model" correspond to the "decision-making strategy" in this disclosure.

The risk control system can include an initialization module 302 to initialize a set of unknown shape parameters defining a basic curve function, e.g., shape parameters a and b in equation (1) are initialized. In one embodiment, the system may randomly generate multiple sets of initial shape parameters and determine multiple curve functions corresponding to the multiple sets of shape parameters. The system can apply modules 304-310 to the multiple curve functions to determine at least one curve function that satisfies a pre-defined fitness requirement and a set of objectives corresponding to a service.

Specifically, for each selection of a set of shape parameters the system can apply an evaluation module 304 to determine a goodness-of-fit of the curve function with respect to a pre-defined curve function associated with an online service. In other words, the goodness-of-fit metric can characterize the similarity between a decision-making strategy evaluation value and a pre-defined decision-making strategy evaluation value. The decision-making strategy evaluation value can correspond to the curve function that is determined based on the set of shape parameters and sample data.

The sample data can include different types of data samples, e.g., data samples generated by an untrusted entity to tamper or manipulate sensitive details in the risk control system, and data samples generated by the normal service or a trusted entity. The sample data can further include a service parameter of a service, e.g., transaction amount, and a risk assessment value of the service, e.g., risk score or risk assessment level. The risk score or the risk assessment level may be a score or level obtained based on an analysis of the service with a risk assessment model. The risk assessment model may be obtained by training a deep learning model based on training data.

Evaluation module 304 can determine a set of objective values associated with each curve function. For example, the set of objective values can include a disturb rate and a coverage rate. The disturb rate can be associated with data generated by untrusted entities, and coverage rate can be associated with data generated by a normal service or a trusted entity.

The coverage rate can be defined as:

$$C_R = \frac{(C_{on\_curve} + C_{above\_curve})}{C_{total}} \quad (2)$$

where $C_R$ denotes the coverage rate associated with a curve function that is determined based on a set of curve parameters; $C_{on\_curve}$ denotes the number of reliable sample data points on the curve; $C_{above\_curve}$ denotes the number of reliable sample data points above the curve; $C_{total}$ denotes the total number of trusted samples. The disturb rate can be defined as:

$$D_R = \frac{(D_{on\_curve} + D_{above\_curve})}{D_{total}} \quad (3)$$

where $D_R$ denotes the disturb rate associated with the curve function determined based on the set of curve parameters; $D_{on\_curve}$ denotes the number of unreliable sample data points on the curve; $D_{above\_curve}$ denotes the number of unreliable sample data points above the curve; $D_{total}$ denotes the total number of unreliable samples.

In response to determining the coverage rate $C_R$ (using equation (2)) and the disturb rate $D_R$ (using equation (3)), evaluation module 304 can calculate a first distance between coordinate points of the calculated disturb rate and the coordinate points of the pre-defined disturb rate. In addition, evaluation module 304 can calculate a second distance between the coordinate points of the calculated coverage rate and the coordinate points of the pre-defined coverage rate. The coordinate points corresponding to the disturb rate, coverage rate, pre-defined disturb rate, and pre-defined coverage rate can be represented in a target coordinate system. The x-coordinate in the target coordinate system can represent the disturb rate and the y-coordinate can represent the coverage rate. Alternatively, the x-coordinate in the target coordinate system can represent the coverage rate and the y-coordinate can represent the disturb rate.

Evaluation module 304 can output the first and the second distance values as fitness or goodness-of-fit metric associated with a curve function. Smaller the distance values greater the fitness of the curve function with respect to the pre-defined decision-making strategy. In other words, the fitness of the curve function can characterize the similarity between the disturb rate determined based on the sample data and the curve function, and the pre-defined disturb rate, i.e., the calculated disturb rate is less than or equal to the pre-defined disturb rate. In addition, the fitness of the curve function can also be used to characterize the similarity between the coverage rate determined based on the sample data and the curve function, and the pre-defined coverage rate, i.e., the calculated coverage rate is greater than or equal to the pre-defined coverage rate. The term "similarity" can also represent a degree of proximity.

The system may then apply a goal matching module 306 to determine whether the first and second distance values output by evaluation module 304 for a corresponding curve function satisfies a set of pre-defined goals or objectives for a specific service. In other words, goal matching module 306 can determine at least one curve function with the best fitness. Specifically, the curve function that satisfies a preset fitness requirement corresponding to the service and has a greater fitness when compared with the other curve functions can be output as the best decision-making strategy for the service.

When the set of pre-defined goals are not satisfied, the system may continue to update the multiple sets of shape parameters iteratively and for each iteration the system may apply modules 304, 306, and 310 until a pre-defined number of iterations are reached or until the set of objectives for the service is satisfied.

Specifically, in each iteration the risk control system can apply a parameter update module 310 to update the multiple sets of shape parameters. Parameter update module 310 can apply two types of modifications to the multiple sets of shape parameters. For example, in one type of modification, parameter update module 310 can multiply a hybridization rate parameter with multiple sets of shape parameters to obtain hybrid multiple set of shape parameters.

For example, prior to executing the update operation the values of the shape parameters a and b for determining the shape of the function can include $\{(a_1, b_1), (a_2, b_2), (a_3, b_3), (a_4, b_4)\}$. The update of these shape parameter values obtained after the hybridization process can include: $\{(a_1+a_2, b_1+b_2), (a_2-a_1, b_2-b_1), (a_3+a_4, b_3+b_4), (a_4-a_3, b_4-b_3)\}$. Alternatively, the curve functions having the best fitness among the four curve functions corresponding to the shape parameter value sets $\{(a_1, b_1), (a_2, b_2), (a_3, b_3), (a_4, b_4)\}$ may be hybridized. For example, when the curve functions corresponding to the curve parameter value sets $(a_1, b_1)$ and $(a_2, b_2)$ result in the best fitness among the four curve functions, the corresponding shape parameter value sets are only hybridized to obtain an updated shape parameter value sets as $(a_1+a_2, b_1+b_2), (a_2-a_1, b_2-b_1)$.

In the second type of modification, parameter update module 310 can randomly select a set of shape parameters from the multiple set of shape parameters to apply a mutation process. For example, prior to executing the update operation the values of the shape parameters a and b for determining the shape of the function can include $\{(a_1, b_1), (a_2, b_2), (a_3, b_3), (a_4, b_4)\}$. The update of these shape parameter values obtained after the mutation process can include: $\{(a_1+0.1, b_1+0.1), (a_2-0.1, b_2-0.1), (a_3+0.2, b_3+0.2), (a_4-0.2, b_4-0.2)\}$. Alternatively, the curve functions having the best fitness among the four curve functions corresponding to the shape parameter value sets $\{(a_1, b_1), (a_2, b_2), (a_3, b_3), (a_4, b_4)\}$ may be mutated.

Optionally, when updating the shape parameter values, parameter update module 310 can first subject the shape parameter values to a hybridization process and then the hybridized shape parameter values can be subject to a mutation process. Parameter update module 310 can generate multiple sets of new shape parameters after combining the hybridized and mutated shape parameters. Furthermore, parameter update module 310 can determine a plurality of new curve functions corresponding to the multiple sets of new shape parameters and can send the plurality of new curve functions to evaluation module 304 to determine fitness values of the plurality of new curve functions. Goal matching module 306 can then determine whether the fitness values corresponding to the new plurality of curve functions satisfies the set of objectives for the service.

When goal matching module 306 determines that there exist no curve function that satisfies the pre-defined set of goals and the new plurality of curve functions was updated for the last time, goal matching module 306 may output a curve function that has a greater fitness compared to the other curve functions in the new plurality of curve functions as the best decision-making strategy. When goal matching module 306 determines that there exists at least one curve function that satisfies the pre-defined set of goals and/or the curve function has a greater fitness compared to the other curve functions, the curve function is selected and recommended as the best decision-making strategy.

Optionally, for the example shown FIG. 3, the system can generate a plurality of curve functions from a basic curve function and determine a decision-making strategy corresponding to the service based on the basic curve function and a set of shape parameters. Alternatively, during operation the system can select a plurality of basic functions with different shapes and the system can generate in parallel a plurality of curve functions based on each basic function. The system can then determine a plurality of decision-making strategies corresponding to the service based on the plurality of basic functions.

Figure 4A:
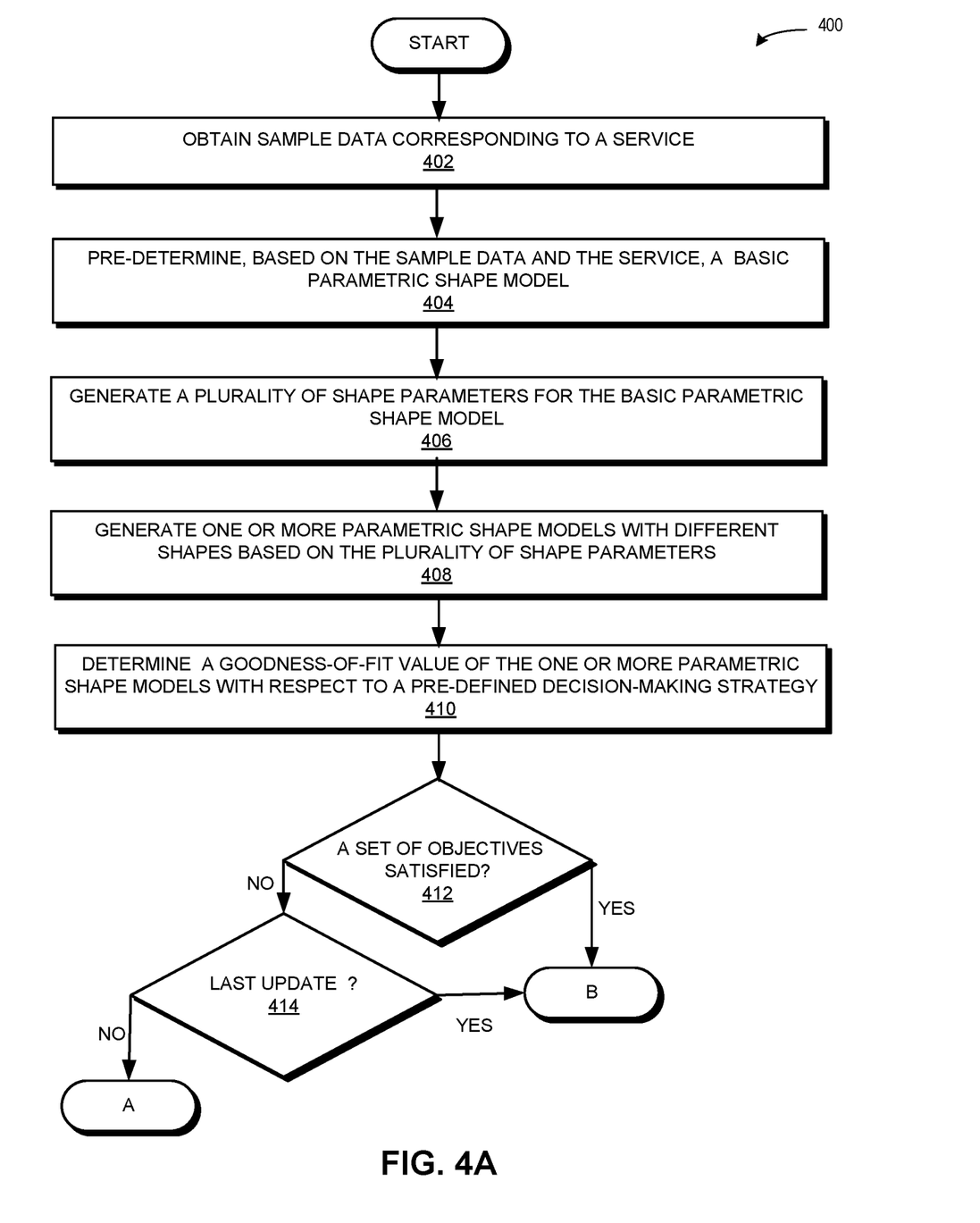
FIG. 4A presents a flowchart illustrating a process for determining a decision-making strategy for a service, according to one embodiment of the present disclosure.
Figure 4B:
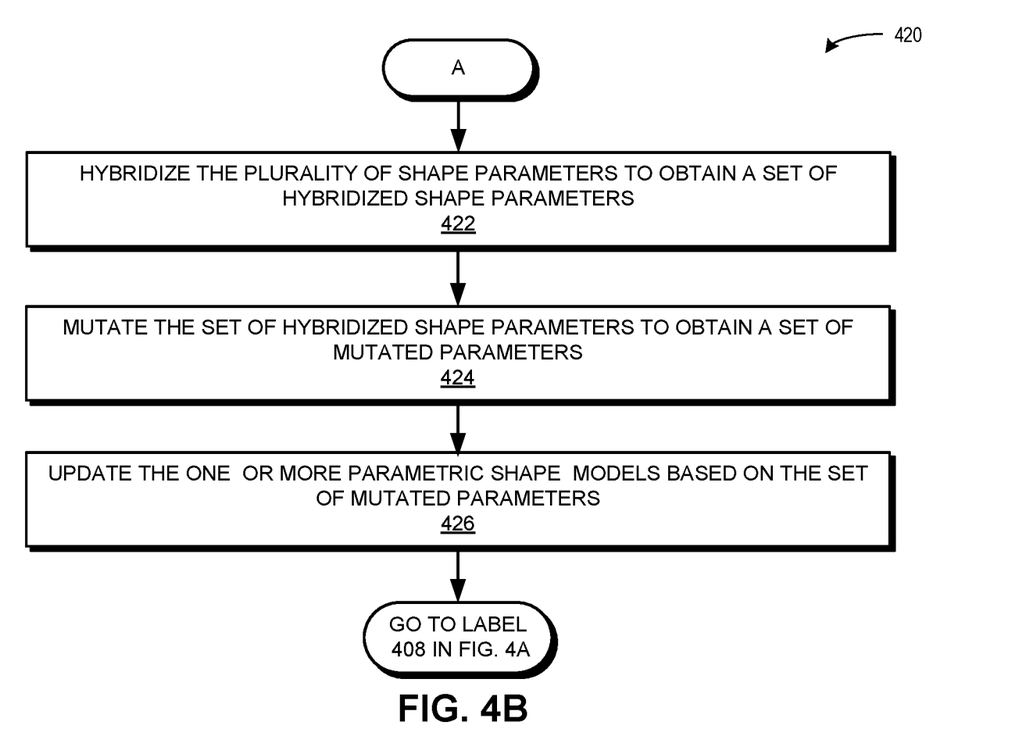
FIG. 4B presents a flowchart illustrating a process for determining the decision-making strategy for a service, according to one embodiment of the present disclosure.
Figure 4C:
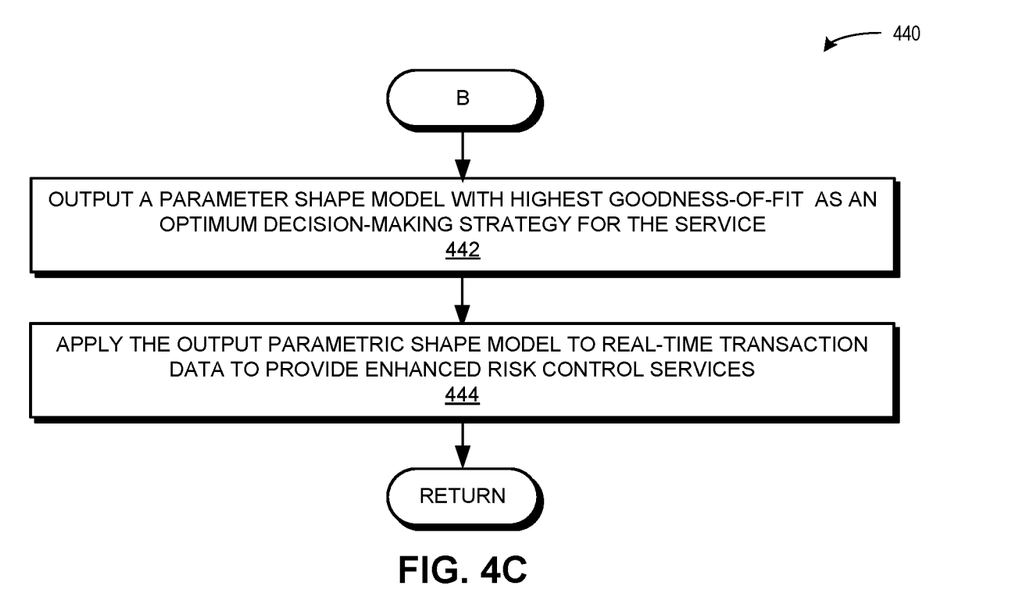
FIG. 4C presents a flowchart illustrating a process for determining the decision-making strategy for a service, according to one embodiment of the present disclosure.

FIGS. 4A, 4B, and 4C present flowcharts 400, 420, and 440 respectively to illustrate a process for determining a decision-making strategy for a service, according to one embodiment of the present disclosure. Referring to FIG. 4A, during operation, a system may obtain sample data corresponding to a service (operation 402). The sample data can include a service parameter, e.g., a transaction amount, and a risk assessment value, e.g., risk score. The system can assume or pre-determine, based on the sample data and the service, a basic parametric shape model or a basic curve function (operation 404). For example, the system can pre-determine the basic parametric shape model based on a scenario of the service.

The shape parameters defining the pre-determined basic parametric shape model can be an unknown quantity, therefore the system can generate a plurality of shape parameters for the basic parametric shape model (operation 406). Different shapes for the basic parametric shape model can be determined based on the plurality of shape parameters. In other words, the system can generate one or more parametric shape models based on the generated plurality of shape parameters and the basic parametric shape model (operation 408). The system can determine a goodness-of-fit of the one or more parametric shape models with respect to a pre-defined decision-making strategy (operation 410). The goodness-of-fit or fitness of each parametric shape model can be defined as a metric for characterizing similarity between the decision-making strategy (determined based on the sample data and the parametric shape model) and a pre-defined decision-making strategy.

Next, the system can determine whether the one or more parametric shape models satisfies a set of pre-defined objectives for the service (operation 412). The set of pre-defined objectives can include a pre-defined fitness requirement, a pre-defined disturb rate, and a pre-defined coverage rate. In one embodiment, the system may first determine that the goodness-of-fit value of each parametric shape model satisfies the pre-defined fitness requirement. In operation 412 the system can further determine whether the disturb rate calculated based on the parametric shape model and the sample data is lower than or equal to the pre-defined disturb rate. Next, the system can determine whether the coverage rate calculated based on the parametric shape model and the sample data is greater than or equal to the pre-defined coverage rate. When the condition in operation 412 is satisfied, the operation continues at label B in FIG. 4C.

When the condition in operation 412 is not satisfied, the system can determine whether the one or more parametric shape models was subject to a last update or the update of the one or more parametric shape models was performed for the last time (operation 414). In other words, when the update of the one or more parametric shape models is performed for the last time, operations at label B is performed. When the condition in operation 414 is not satisfied, i.e., the update of the one or more parametric shape models is not performed for the last time, operation continues at label A.

Referring to FIG. 4B, in response to determining that the one or more parametric shape models does not satisfy the pre-defined set of objectives and that the update of the one or more parametric shape models is not performed for the last time, the system may hybridize the plurality of shape parameters to obtain a hybridized set of shape parameters (operation 422). In other words, the system may apply a hybridization process to the shape parameters to obtain the set of hybridized shape parameters. Next, the system can subject the hybridized set of shape parameters to mutation processing to obtain mutated set of shape parameters (operation 424). Optionally, the system may only perform the hybridization process with respect to the shape parameters and the system can update the parametric shape model based on the hybridized set of shape parameters. Alternatively, the system may only perform mutation processing of the shape parameters and the system can use the resulting shape parameters to update the one or more parametric shape models.

However, when the system needs to perform both the hybridization processing and the mutation processing of the shape parameters, the system may first perform the hybridization processing and then the mutation processing. Alternatively, the system may first perform mutation processing and then the hybridization processing. In response to updating the shape parameters in operation 422 and/or operation 424, the system can update the parametric shape model based on the updated shape parameters (operation 426). The system may then continue operation at label 408 of FIG. 4A.

Referring to FIG. 4C, in response to determining that there exists no parametric shape model that satisfies the pre-defined set of objectives and that the update of the curve functions is performed for the last time, the system may determine a parametric shape model with the best fitness as the optimal parametric shape model and outputs this optimal parametric shape model to the service side (operation 442). In other words, when the system performs a last update of the one or more parametric shape models and the updates to the one or more parametric shape models do not satisfy the set of objectives, the system can select at least one updated parametric shape model with the best goodness-of-fit as the optimal parametric shape model. The system can then apply the optimal parametric shape model to real-time transaction data to provide enhanced risk control services (operation 444) and the operation returns.

Exemplary Computer System and Apparatus

Figure 5:
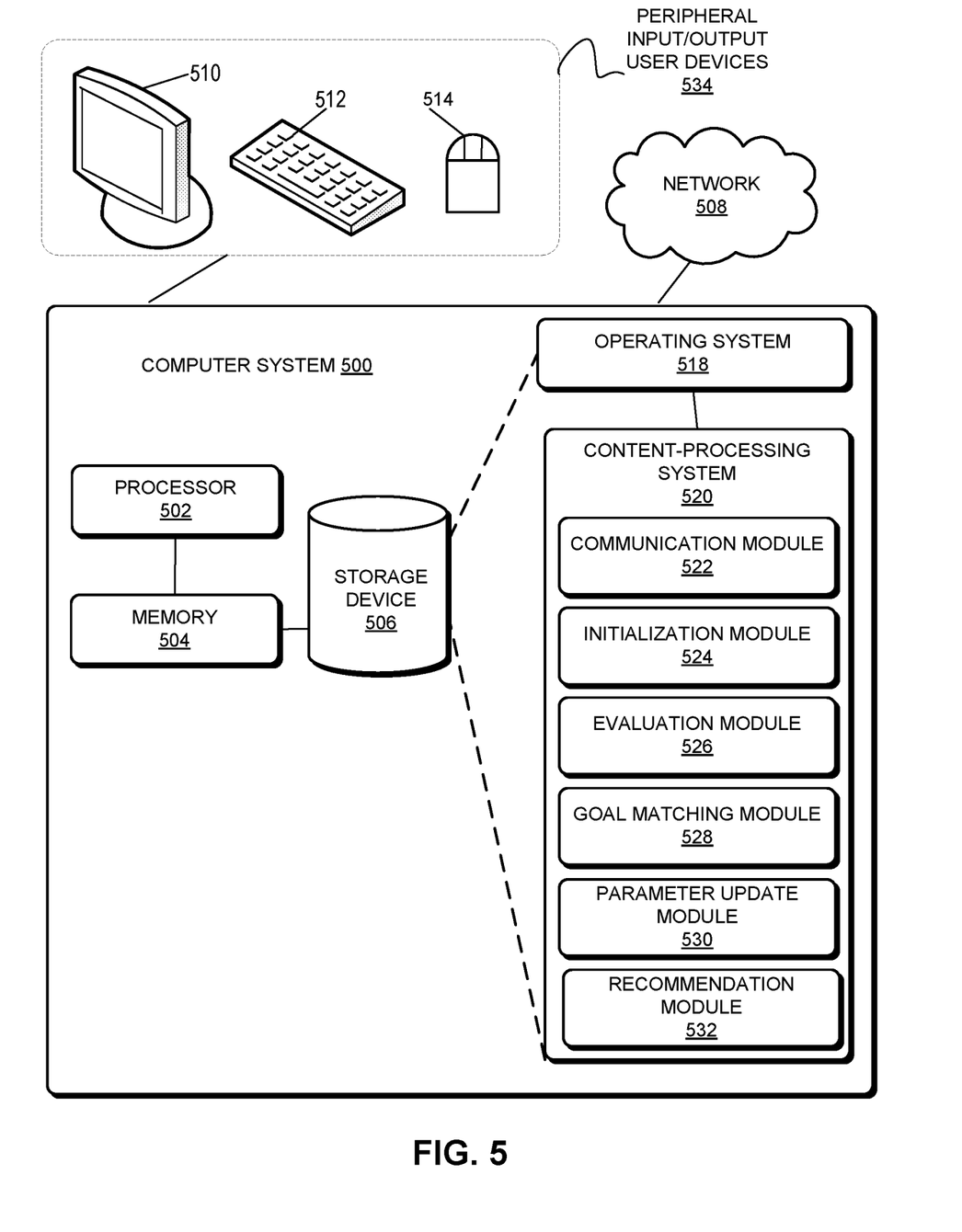
FIG. 5 illustrates an exemplary computer system that facilitates determining a decision-making strategy for a service, according to one embodiment of the present disclosure.

FIG. 5 illustrates an exemplary computer system that facilitates determining a decision-making strategy, according to one embodiment of the present disclosure. Computer system 500 can include a processor 502, a memory 504, and a storage device 506. Computer system 500 can be coupled to a plurality of peripheral input/output devices 534, e.g., a display device 510, a keyboard 512, and a pointing device 514, and can also be coupled via one or more network interfaces to network 508. Storage device 506 can store an operating system 518 and a content processing system 520.

In one embodiment, content processing system 520 can include instructions, which when executed by processor 502 can cause computer system 500 to perform methods and/or processes described in this disclosure. Content processing system 520 can include a communication module 522 to obtain sample data corresponding to a service and one or more basic curve functions for the service. Content processing system 520 can further include instructions to implement an initialization module 524 for initializing a plurality of shape parameters for the one or more curve functions and determine different shapes for the one or more curve functions based on the plurality of shape parameters. Content processing system 520 can include an evaluation module 526 for determining a goodness-of-fit of the one or more curve functions with respect to a pre-defined decision-making strategy.

Content processing system 520 can further include a goal matching module 528 for determining whether the goodness-of-fit of the one or more curve functions satisfy a set of objectives corresponding to the service. Content processing system 520 can include a parameter update module 530 for iteratively updating the set of curve parameters. For each iteration, content processing system 520 may apply evaluation module 526, goal matching 528, and parameter update module 530 to determine a best decision-making strategy. The shape parameters are iteratively updated until a threshold number of iterations have reached or an optimum curve function satisfying the fitness requirements is obtained. Content processing system 520 can include a recommendation module 532 to recommend the optimum curve function to the service for performing enhanced protection against risks.

Figure 6:
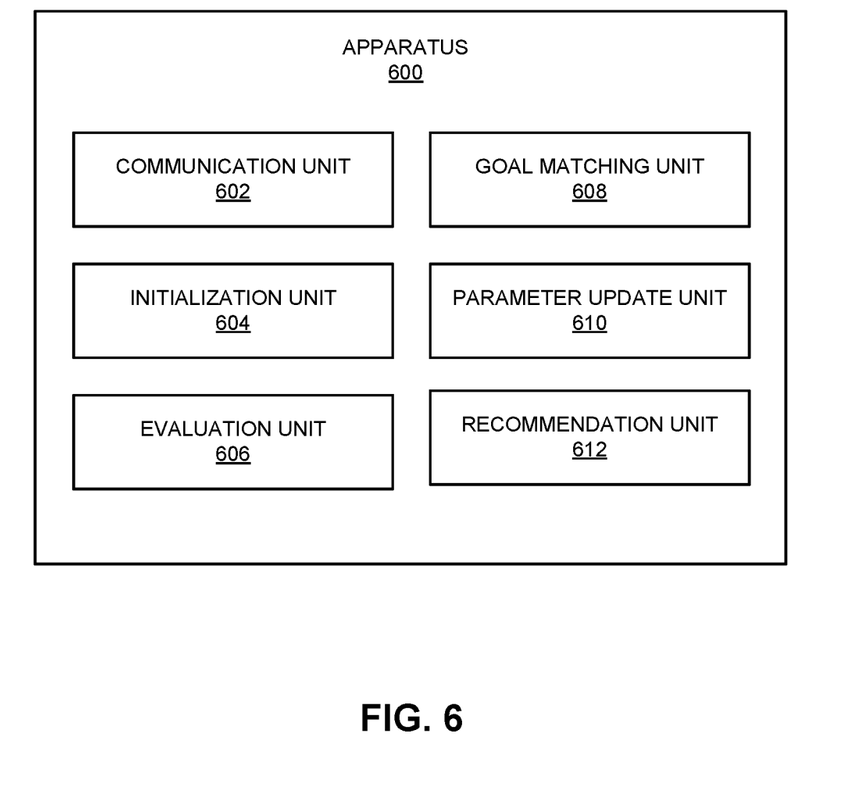
FIG. 6 illustrates an exemplary apparatus that facilitates determining a decision-making strategy, according to one embodiment of the present disclosure.

FIG. 6 illustrates an exemplary apparatus that facilitates a data compression scheme, according to one embodiment of the present disclosure. Apparatus 600 can include a plurality of units or apparatuses that may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device that is capable of communicating with other computer systems and/or devices. Specifically, apparatus 600 can include units 602-614, which perform functions or operations similar to modules 522-532 of computer system 500 in FIG. 5. Apparatus 600 can include: a communication unit 602, an initialization unit 604, an evaluation unit 606, a goal matching unit 608, a parameter update unit 610, and a recommendation unit 612.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A computer-implemented method, comprising:
obtaining sample data corresponding to a service;
pre-determining, based on the sample data and the service, a basic parametric shape model;
training, through machine learning, the basic parametric shape model by iteratively performing acts including:
generating a plurality of shape parameters for the basic parametric shape model;
generating, based on the plurality of shape parameters, one or more parametric shape models with different shapes;
determining goodness-of-fit of the one or more parametric shape models with respect to a predefined decision-making strategy;
in response to determining that the goodness-of-fit of the one or more parametric shape models does not satisfy the set of objectives:
one or more of hybridizing the plurality of shape parameters to generate a hybridized set of shape parameters or mutating the plurality of shape parameters to generate a mutated set of shape parameters; and
updating the one or more parametric shape models based on one or more of the hybridized set of shape parameters or the mutated set of shape parameters;
in response to determining that the goodness-of-fit of at least one parametric shape model satisfies a set of objectives, outputting the at least one parametric shape model as a decision-making strategy for the service; and applying the decision-making strategy to real-time transaction data to provide enhanced risk-control for the service.

2. The method of claim 1, wherein the goodness-of-fit corresponds to a measure of similarity between the pre-defined decision-making strategy and a respective decision-making strategy corresponding to the one or more parametric shape models.

3. The method of claim 1, wherein determining the goodness-of-fit of the one or more parametric shape models with respect to the predefined decision-making strategy further comprises:
   determining, based on each parametric shape model and the sample data, a disturb rate and a coverage rate, wherein the disturb rate is associated with a first portion of sample data generated by a reliable service, and wherein the coverage rate is associated with a second portion of the sample data generated by an unreliable entity;
   determining a difference between the disturb rate and a pre-defined disturb rate associated with the pre-defined decision-making strategy; and
   determining a difference between the coverage rate and a pre-defined coverage rate associated with the pre-defined decision-making strategy.

4. The method of claim 1, wherein the set of objectives include one or more of:
   a pre-defined goodness-of-fit;
   a pre-defined disturb rate; and
   a pre-defined coverage rate.

5. The method of claim 1, further comprising:
   in response to determining that the goodness-of-fit of the one or more parametric shape models does not satisfy the set of objectives and the one or more parametric shape models corresponds to a last update of the plurality of shape parameters, outputting a parametric shape model with best goodness-of-fit as an optimum decision-making strategy for the service.

6. The method of claim 1, wherein the one or more parametric shape models describe a relationship between a service parameter of the service and a risk assessment value of the service.

7. A computer system, comprising:
   one or more processors; and
   one or more storage devices coupled to the one or more processors and, individually or collectively storing instructions which when executed by the one or more processors cause the one or more processors to, individually or collectively, perform a method, the method comprising
   obtaining sample data corresponding to a service;
   pre-determining, based on the sample data and the service, a basic parametric shape model;
   training, through machine learning, the basic parametric shape model by iteratively performing acts including:
      generating a plurality of shape parameters for the basic parametric shape model;
      generating, based on the plurality of shape parameters, one or more parametric shape models with different shapes;
      determining goodness-of-fit of the one or more parametric shape models with respect to a predefined decision-making strategy; and
      in response to determining that the goodness-of-fit of the one or more parametric shape models does not satisfy the set of objectives;
         one or more of hybridizing, the plurality of shape parameters to generate a hybridized set of shape parameters or mutating the plurality of shape parameters to generate a mutated set of shape parameters; and
         updating the one or more parametric shape models based on one or more of the hybridized set of shape parameters or the mutated set of shape parameters;
   in response to determining that the goodness-of-fit of at least one parametric shape model satisfies a set of objectives, outputting the at least one parametric shape model as a decision-making strategy for the service; and
   applying the decision-making strategy to real-time transaction data to provide enhanced risk-control for the service.

8. The computer system of claim 7, wherein the goodness-of-fit corresponds to a measure of similarity between the pre-defined decision-making strategy and a respective decision-making strategy corresponding to the one or more parametric shape models.

9. The computer system of claim 7, wherein determining the goodness-of-fit of the one or more parametric shape models with respect to the predefined decision-making strategy further comprises:
   determining, based on each parametric shape model and the sample data, a disturb rate and a coverage rate, wherein the disturb rate is associated with a first portion of sample data generated by a reliable service, and wherein the coverage rate is associated with a second portion of the sample data generated by an unreliable entity;
   determining a difference between the disturb rate and a pre-defined disturb rate associated with the pre-defined decision-making strategy; and
   determining a difference between the coverage rate and a pre-defined coverage rate associated with the pre-defined decision-making strategy.

10. The computer system of claim 7, wherein the method further comprises:
   in response to determining that the goodness-of-fit of the one or more parametric shape models does not satisfy the set of objectives and the one or more parametric shape models corresponds to a last update of the plurality of shape parameters, outputting a parametric shape model with best goodness-of-fit as an optimum decision-making strategy for the service.

11. A non-transitory computer-readable storage medium storing instructions that when executed by a computer cause the computer to perform a method, the method comprising:
   obtaining sample data corresponding to a service;
   pre-determining, based on the sample data and the service, a basic parametric shape model;
   training, through machine learning, the basic parametric shape model by iteratively performing acts including:
      generating a plurality of shape parameters for the basic parametric shape model;
      generating, based on the plurality of shape parameters, one or more parametric shape models with different shapes;
      determining goodness-of-fit of the one or more parametric shape models with respect to a predefined decision-making strategy; and
      in response to determining that the goodness-of-fit of the one or more parametric shape models does not satisfy the set of objectives:

one or more of hybridizing the plurality of shape parameters to generate a hybridized set of shape parameters or mutating the plurality of shape parameters to generate a mutated set of shape parameters; and updating the one or more parametric shape models based on one or more of the hybridized set of shape parameters or the mutated set of shape parameters;

in response to determining that the goodness-of-fit of at least one parametric shape model satisfies a set of objectives, outputting the at least one parametric shape model as a decision-making strategy for the service; and applying the decision-making strategy to real-time transaction data to provide enhanced risk-control for the service.

12. The non-transitory computer-readable storage medium of claim 11, wherein the goodness-of-fit corresponds to a measure of similarity between the pre-defined decision-making strategy and a respective decision-making strategy corresponding to the one or more parametric shape models.

13. The non-transitory computer-readable storage medium of claim 11, wherein determining the goodness-of-fit of the one or more parametric shape models with respect to the predefined decision-making strategy further comprises:

determining, based on each parametric shape model and the sample data, a disturb rate and a coverage rate, wherein the disturb rate is associated with a first portion of sample data generated by a reliable service, and wherein the coverage rate is associated with a second portion of the sample data generated by an unreliable entity;

determining a difference between the disturb rate and a pre-defined disturb rate associated with the pre-defined decision-making strategy; and determining a difference between the coverage rate and a pre-defined coverage rate associated with the pre-defined decision-making strategy.

14. The non-transitory computer-readable storage medium of claim 11, the method further comprising:

in response to determining that the goodness-of-fit of the one or more parametric shape models does not satisfy the set of objectives and the one or more parametric shape models corresponds to a last update of the plurality of shape parameters, outputting a parametric shape model with best goodness-of-fit as an optimum decision-making strategy for the service.

15. The computer system of claim 7, wherein the set of objectives include one or more of:

a pre-defined goodness-of-fit;

a pre-defined disturb rate; and a pre-defined coverage rate.

16. The computer system of claim 7, wherein the one or more parametric shape models describe a relationship between a service parameter of the service and a risk assessment value of the service.

17. The non-transitory computer-readable storage medium of claim 11, wherein the set of objectives include one or more of:

a pre-defined goodness-of-fit;

a pre-defined disturb rate; and a pre-defined coverage rate.

18. The non-transitory computer-readable storage medium of claim 11, wherein the one or more parametric shape models describe a relationship between a service parameter of the service and a risk assessment value of the service.

* * * * *

UNITED STATES PATENT AND TRADEMARK OFFICE
CERTIFICATE OF CORRECTION

| | |
|---|---|
| PATENT NO. | : 11,978,000 B2 |
| APPLICATION NO. | : 16/945277 |
| DATED | : May 7, 2024 |
| INVENTOR(S) | : Dapeng Fu et al. |

Page 1 of 1

It is certified that error appears in the above-identified patent and that said Letters Patent is hereby corrected as shown below:

In the Claims

Column 14, Claim 7, Line 1:
"of hybridizing, the plurality" should read: --hybridizing the plurality--.

Signed and Sealed this
Thirtieth Day of July, 2024

Katherine Kelly Vidal
*Director of the United States Patent and Trademark Office*